United States Patent
McKinstrie et al.

(10) Patent No.: US 7,764,423 B2
(45) Date of Patent: Jul. 27, 2010

(54) POLARIZATION-INDEPENDENT FOUR-WAVE MIXING IN A BIREFRINGENT FIBER

(75) Inventors: Colin J. McKinstrie, Manalapan, NJ (US); Chongjin Xie, Morganville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 87 days.

(21) Appl. No.: 12/259,389

(22) Filed: Oct. 28, 2008

(65) Prior Publication Data

US 2010/0103505 A1  Apr. 29, 2010

(51) Int. Cl.
*G02F 1/35* (2006.01)
*H04B 10/00* (2006.01)

(52) U.S. Cl. .............. 359/330; 359/326; 389/152; 389/180

(58) Field of Classification Search ............ 359/326, 359/330; 398/152, 177–180; 372/6, 21, 372/69–71
See application file for complete search history.

(56) References Cited

U.S. PATENT DOCUMENTS

| | | | | |
|---|---|---|---|---|
| 3,617,912 A | 11/1971 | Miller | ............... | 330/4.6 |
| 3,875,422 A | 4/1975 | Stolen | ............... | 359/330 |
| 4,349,907 A | 9/1982 | Campillo et al. | ........... | 372/92 |
| 5,353,362 A | 10/1994 | Tucci | ............... | 385/27 |
| 5,386,314 A | 1/1995 | Jopson | ............... | 359/330 |
| 5,771,117 A | 6/1998 | Harris et al. | ........... | 359/326 |
| 6,522,818 B1 | 2/2003 | Aso et al. | ........... | 385/122 |
| 7,164,526 B2 | 1/2007 | McKinstrie | | |
| 7,369,779 B1 | 5/2008 | Croussore et al. | ........... | 398/176 |
| 7,450,298 B2 * | 11/2008 | Watanabe | ........... | 359/333 |
| 2004/0042060 A1 | 3/2004 | McKinstrie et al. | ........ | 359/330 |
| 2004/0095635 A1 | 5/2004 | Kakui | ................ | 359/334 |
| 2006/0285197 A1 | 12/2006 | McKinstrie | | |
| 2007/0216994 A1 | 9/2007 | McKinstrie | | |

(Continued)

OTHER PUBLICATIONS

C. J. McKinstrie, R. O. Moore, S. Radic, and R. Jiang, "Phase-sensitive amplification of chirped optical pulses in fibers," Opt. Express 15, 3737-3758 (2007) http://opticsinfobase.org/abstract.cfm?URI=oe-15-7-3737.

(Continued)

*Primary Examiner*—Hemang Sanghavi
(74) *Attorney, Agent, or Firm*—Mendelsohn, Drucker & Associates, P.C.; Yuri Gruzdkov; Steve Mendelsohn

(57) ABSTRACT

A two-pump optical parametric device (OPD) having a nonlinear birefringent fiber, in which various four-wave mixing (FWM) processes can occur. The OPD applies, to the nonlinear birefringent fiber, two pump waves, each polarized at about 45 degrees with respect to a birefringence axis of the fiber, and a polarized input signal. A relevant FWM process couples the pump waves and the signal to cause the fiber to generate a desired output signal. In one configuration, the relevant FWM process is inverse modulational interaction, which causes the desired output signal to be generated through amplification or attenuation of the input signal. In another configuration, the relevant FWM process is phase conjugation, which causes the desired output signal to be generated through amplification of the input signal. In yet another configuration, the relevant FWM process is Bragg scattering, which causes the desired output signal to be generated as a corresponding idler signal.

20 Claims, 11 Drawing Sheets

U.S. PATENT DOCUMENTS

2008/0131138 A1* 6/2008 Futami et al. ............... 398/152
2009/0290882 A1* 11/2009 Watanabe ................... 398/152

OTHER PUBLICATIONS

D. Levandovsky, M. Vasilyev, and P. Kumar, "Amplitude squeezing of light by means of phase-sensitive fiber parametric amplifier," Opt. Lett. 24, 984-986 (1999) http://opticsinfobase.org/abstract.cfm?URI=ol-24-14-984.
Ruo-Ding Li; Kumar, P.; Kath, W.L., "Dispersion compensation with phase-sensitive optical amplifiers," Lightwave Technology, Journal of, vol. 12, No. 3, pp. 541-549, Mar. 1994. URL:http://ieeexplore.ieee.org/iel1/50/7064/00285338.pdf.
Robert W. W. Boyd. Nonlinear Optics. Elsevier Science & Technology Books. Pub. Date: Dec. 1992. pp. 241-257.
"Use of Cavities in Squeezed-State Generation," Bernard Yurke, The American Physical Society, Physical Review A, vol. 29, No. 1, Jan. 1984, pp. 408-410.
"Squeezed-State Generation Via Forward Degenerate Four-Wave Mixing," by Prem Kumar and Jeffrey Shapiro, vol. No. 3, The American Physical Society, Physical Review A, Sep. 1984, pp. 1568-1571.
"Generation and Detection of Squeezed States of Light by Nondegenerate Four-Wave Mixing in an Optical Fiber," by M.D. Levenson, et al., The American Physical Society, Physical Review A, vol. 32, No. 3, Sep. 1985, pp. 1550-1562.
"Squeezed -Light Generation in a Medium Governed by the Nonlinear Schrödinger Equation," by M.J. Potasek and B. Yurke, The American Physical Society, Physical Review A. vol. 35, No. 9, May 1, 1987, pp. 3974-3977.
"Quantum propagation: Squeezing via modulation polarization instabilities in a birefringent nonlinear medium," by T.A.B. Kennedy and S. Wabnitz, The American Physical Society, Physical Review A, vol. 38, No. 1, Jul. 1988, pp. 563-569.
"Squeezing of pulses in a nonlinear interferometer," by M. Shirasaki and H.A. Haus, Optical Society of America, J. Opt. Soc. Am. B, vol. 7, No. 1, Jan. 1990, pp. 30-34.
"Optical Amplification in a nonlinear fibre interferometer," by M.E. Marhic et al., Electronics Letters, vol. 27, No. 3, Jan. 31, 1991, pp. 210-211.
"Nonlinear Optics," by Robert W. Boyd, The Institute of Optics, Chapter 1: The Nonlinear Susceptibility, pp. 1-37, Chapter 2: Wave-Equation Description of Nonlinear Optical Interactions, pp. 57-63, 2003.
G. M. D'Ariano. Squeezing-symmetry of the balanced homodyne detector. From book titled: Quantum Aspects of Optical Communications. 1991. DOI-10.1007/3-540-53862-3_193. http://www.springerlink.com/content/f12w2k01358123qv.
Agrawal, Govind P. Fiber-Optic Communication Systems. 1997, John Wiley and Sons Inc. New York, NY. pp. 62-65, 326-329, 380-385, 392-397, 448-449.
M. Vasilyev, "Distributed phase-sensitive amplification," Opt. Express 13, 7563-7571 (2005) http://www.opticsinfobase.org/abstract.cfm?URI=oe-13-19-7563.
K. Abe, M. Amano, and T. Omatsu, "Efficient phase conjugation by pico-second four-wave-mixing in solid-dye amplifier," Opt. Express 12, 1243-1248 (2004) http://www.opticsinfobase.org/abstract.cfm?URI=oe-12-7-1243.
D.R. Matthys and E.T. Jaynes, "Phase-sensitive optical amplifier," J. Opt. Soc. Am. 70, 263-(1980) http://www.opticsinfobase.org/abstract.cfm?URI=josa-70-3-263.
K. Croussore, I. Kim, Y. Han, C. Kim, G. Li, and S. Radic,"Demonstration of phase-regeneration of DPSK signals based on phase-sensitive amplification," Opt. Express 13, 3945-3950 (2005) http://www.opticsinfobase.org/abstract.cfm?URI=oe-13-11-3945.
"Applications of Nonlinear Fiber Optics," Govinda P. Agrawal, Nonlinear Fiber Optics, Third Edition, Optics and Photonics, Academic Press, pp. 40-41, 164-165, 388-393, Jan. 31, 2001.
"Performance of a Reconfigurable Wavelength Converter Based on Dual-Pump-Wave Mixing in a Semiconductor Optical Amplifier" by I. Tomkos et al., IEEE Photonics Technology Letters, vol. 10, No. 10, Oct. 1998, pp. 1404-1406.
"Theory of Noise Accumulation in Linear Optical-Amplifier Chains," by Rodney Loudon, IEE Journal of Quantum Electronics, vol. QB-21, No. 7, Jul. 1985, pp. 766-773.
"Reduction of Quantum Fluctuation and Suppression of the Gordon-Haus Effect With Phase-Sensitive Linear Amplifiers," by Horace P. Yuen, Optical Society of America, Optics Letters, vol. 17, No. 1, Jan. 1, 1992, pp. 73-75.
"Parametric Amplifiers in Phase-Noise-Limited Optical Communications," by Yi Mu and C.M. Savage, Optical Society of America, vol. 9, No. 1, Jun. 1992, pp. 65-70.
"Combating Dispersion with Parametric Amplifiers," Ruo-Ding et al., IEEE Photonics Technology Letters, vol. 5, No. 6, Jun. 1993, pp. 669-672.
"Reduction of Fiber-Nonlinearity-Enhanced Amplifier Noise by Means of Phase-Sensitive Amplifiers," by Wataru Imajuku and Atsushi Takada, Optical Society of America, Optics Letters, vol. 22, No. 1, Jan. 1, 1997, pp. 31-33.
"Generation and Detection of Two-Photon Coherent States in Degenerate Four-Wave Mixing," by Horace P. Yuen and Jeffrey H. Shapiro, Optical Society of America, Optics Letters, vol. 4, No. 10, Oct. 1979, pp. 334-336.

* cited by examiner

1400

POLARIZATION-INDEPENDENT FOUR-WAVE MIXING IN A BIREFRINGENT FIBER

CROSS-REFERENCE TO RELATED APPLICATIONS

The subject matter of this application is related to that of U.S. Pat. No. 7,164,526 and U.S. Patent Application Publication Nos. 2006/0285197 and 2007/0216994, all of which are incorporated herein by reference in their entirety.

BACKGROUND OF THE INVENTION

1. Field of the Invention

The present invention relates to optical communication equipment and, more specifically, to optical amplifiers, attenuators, and/or wavelength converters.

2. Description of the Related Art

Optical communication systems employ optical parametric devices (OPDs), e.g., to compensate for optical-signal attenuation in transmission fibers and/or regenerate optical signals. An OPD usually has a nonlinear fiber (NLF) or nonlinear planar optical waveguide (NPOW) that enables various four-wave mixing (FWM) processes to occur and be used to amplify, attenuate, frequency-convert, phase-conjugate, regenerate, and/or sample optical communication signals.

SUMMARY OF THE INVENTION

According to one embodiment, a method of operating an OPD adapted to generate a desired output signal has the step of applying first and second polarized pumps to a birefringent optical medium adapted to perform FWM, wherein each of the first and second pumps is polarized at about 45 degrees with respect to a birefringence axis of the optical medium. The method also has the steps of applying an input signal S to the optical medium and generating, in the optical medium, the desired output signal via an FWM process that couples the first and second pumps and the signal S.

According to another embodiment, an OPD for generating a desired output signal comprises a birefringent optical medium adapted to perform FWM and one or more couplers adapted to apply first and second polarized pumps and an input signal S to the optical medium. Each of the first and second pumps is polarized at about 45 degrees with respect to a birefringence axis of the optical medium. The optical medium is adapted to generate the desired output signal via an FWM process that couples the first and second pumps and the signal S.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Figure 2:
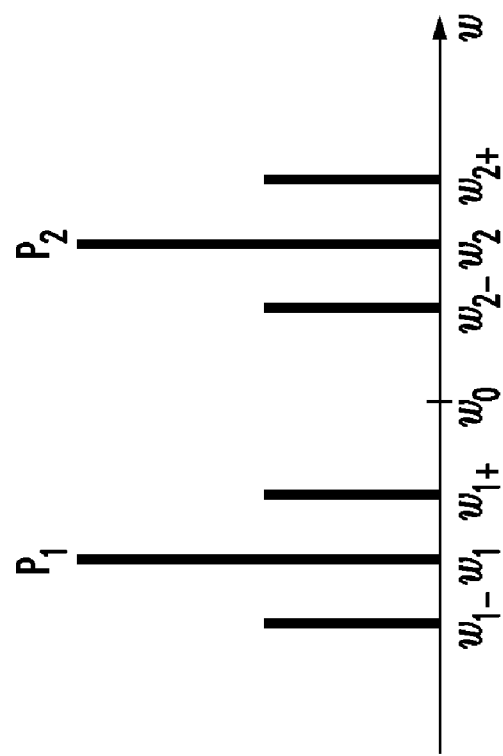
FIG. 2 graphically shows a simplified frequency structure that may be developed via OPA in a two-pump configuration.

NLFs and NPOWs often exhibit some degree of birefringence, either by design or due to inherent limitations and/or imperfections of the corresponding fiber-fabrication processes. Fiber birefringence causes many FWM processes to depend sensitively on signal polarization. At the same time, transmission fibers used in optical communication systems do not normally preserve signal polarization. As a result, polarization of an optical signal applied to an OPD by the optical communication system might vary over time, thereby causing undesirable fluctuations in the power and other important characteristics of the output signal produced by the OPD.

Various embodiments of a two-pump optical parametric device (OPD) having a nonlinear birefringent fiber, in which various four-wave mixing (FWM) processes can occur, address various problems recognized herein. The OPD applies, to the nonlinear birefringent fiber, (i) two pump waves, each polarized at about 45 degrees with respect to a birefringence axis of the fiber, and (ii) a polarized input signal. A relevant FWM process couples the pump waves and the signal to cause the nonlinear birefringent fiber to generate a desired output signal. In one configuration of the OPD, the relevant FWM process is inverse modulational interaction, which causes the desired output signal to be generated through amplification or attenuation of the input signal. In another configuration of the OPD, the relevant FWM process is phase conjugation, which causes the desired output signal to be generated through amplification of the input signal. In yet another configuration of the OPD, the relevant FWM process is Bragg scattering, which causes the desired output signal to be generated as a corresponding idler signal. Advantageously, the OPD enables the power of the output signal to be substantially independent of the polarization of the input signal.

As used in this specification and the appended claims the term "phase sensitive" refers to an optical process that converts an optical input signal into an optical output signal in such a way that the power of the output signal depends on the phase of the input signal, wherein said phase is measured with respect to the phase of the corresponding pump light wave(s). If the power of the output signal does not depend on the phase of the input signal, then the corresponding optical process is termed "phase insensitive." Examples of phase-sensitive optical parametric processes include frequency doubling, sum- and difference-frequency generation, parametric amplification and oscillation, four-wave mixing, etc.

The term "phase sensitive" is a term of art that should not be confused with the term "phase matching." The latter term essentially means that a proper phase relationship (that minimizes or nulls the quantity called the "phase mismatch") between the interacting waves is maintained. A phase-matching attribute of a nonlinear optical process is different from its phase-sensitivity or phase-insensitivity because phase matching generally applies to both phase-sensitive and phase-insensitive processes.

A phase-sensitive optical process is characterized by a property called a "squeezing transformation," which couples, in a particular manner, the output light signal and pump light. A representative squeezing transformation is described in the above-cited U.S. Patent Application Publication No. 2006/0285197 in reference to contained-therein Eqs. (9a)-(9c). Phase-sensitive optical processes described in this specification may be similarly characterized by squeezing transformations.

Four-Wave Mixing

Figure 1:
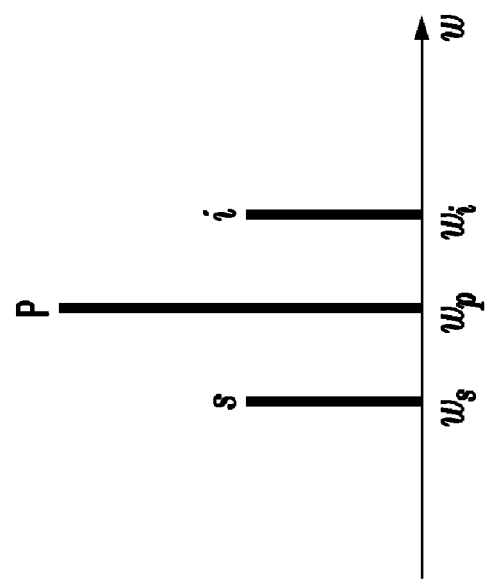
FIG. 1 graphically shows a simplified frequency structure that may be developed via a representative optical parametric amplification (OPA) process in a single-pump configuration.

FIG. 1 graphically illustrates a representative optical-parametric-amplification (OPA) process in a single-pump configuration. More specifically, in the configuration of FIG. 1, the OPA process is governed by degenerate four-wave mixing (FWM), in which two pump photons (labeled P) combine to generate one "signal" photon and one "idler" photon (labeled s and i, respectively) according to the following equation:

$$2\omega_P = \omega_s + \omega_i \quad (1)$$

where $\omega_P$, $\omega_s$, and $\omega_i$ are the frequencies of the pump, signal, and idler photons, respectively. The nonlinear optical medium, in which the FWM process occurs, is characterized by a nonlinearity coefficient ($\gamma$) and a set dispersion coefficients, each of which is frequency dependent. The frequency or wavelength at which the second-order dispersion coefficient equals zero is referred to as the zero-dispersion frequency (ZDF, $\omega_0$) or wavelength ($\lambda_0$). The regions in which the second-order dispersion coefficient is positive and negative are referred to as the normal dispersion region and the anomalous dispersion region, respectively.

The degenerate FWM process of FIG. 1 occurs when the wavelength of the pump wave is in the anomalous dispersion region of the nonlinear optical medium (e.g., optical fiber). It is known in the art that the parametric gain depends on the intensity of the pump wave ($I_P$) and the interaction length in the optical fiber. Depending on the relationship between (1) the wave-vector mismatch coefficient ($\kappa$) in the optical fiber, (2) the nonlinearity coefficient, $\gamma$, and (3) the intensity of the pump wave, $I_P$, FWM can produce either exponential or quadratic gain. For example, if the intensity of the pump wave is chosen such that $\kappa = -\gamma I_P$, then the gain is relatively high and exponential. In contrast, if $\kappa = 0$, then the gain is quadratic. Other values of $\kappa$ will correspond to a relatively low exponential gain or no gain at all.

FIG. 2 shows a simplified diagram of the frequency structure developed via OPA in a two-pump configuration. In the presence of two pump waves labeled $P_1$ and $P_2$ located at frequencies $\omega_1$ and $\omega_2$, respectively, and an optical communication signal (illustratively a sideband at frequency $\omega_{1-}$), various FWM interactions in the nonlinear optical medium produce three complementary sidebands at frequencies $\omega_{1+}$, $\omega_{2-}$, and $\omega_{2+}$. In general, the optical communication signal may correspond to any one of the four sidebands, with the remaining three sidebands being generated by FWM processes.

The following describes the FWM processes that lead to the frequency structure shown in FIG. 2. Assuming that the optical communication signal is at frequency $\omega_{1-}$ and the remaining three sidebands are idler sidebands, the modulational interaction (MI) may produce a first idler sideband at frequency $\omega_{1+}$ according to Eq. (2):

$$2\omega_1 = \omega_{1-} + \omega_{1+} \quad (2)$$

A Bragg scattering (BS) process may produce a second idler sideband at frequency $\omega_{2-}$ according to Eq. (3):

$$\omega_{1-} + \omega_2 = \omega_1 + \omega_{2-} \quad (3)$$

A phase-conjugation (PC) process may produce a third idler sideband at frequency $\omega_{2+}$ according to Eq. (4):

$$\omega_1 + \omega_2 = \omega_{1-} + \omega_{2+} \quad (4)$$

In addition, each of the three idler sidebands may couple to the other two idler sidebands by an appropriate FWM process, i.e., MI, BS, or PC, that can be expressed by an equation analogous to one of Eqs. (2), (3), or (4).

In addition to the sidebands illustrated in FIG. 2, OPA may also generate several additional sidebands (not shown). For example, MI with $P_2$ may generate an additional sideband at frequency $2\omega_2 - \omega_1 + \delta\omega$, where $\delta\omega = \omega_1 - \omega_{1-}$. Also, a BS process with respect to $P_1$ may generate another sideband at frequency $2\omega_1 - \omega_2 - \delta\omega$. Similarly, the sidebands at frequencies $\omega_{1+}$ and $\omega_{2-}$ may each couple to additional sidebands at frequencies $2\omega_2 - \omega_1 - \delta\omega$ and $2\omega_1 - \omega_2 + \delta\omega$, and the sideband at frequency $\omega_{2+}$ may couple to the aforementioned additional sidebands with frequencies $2\omega_2 - \omega_1 + \delta\omega$ and $2\omega_1 - \omega_2 - \delta\omega$. However, unlike the four original sidebands shown in FIG. 2, each of which may couple to each of the other three, none of the additional sidebands would typically couple to all of the original four or all of the other three additional sidebands. Furthermore, for most values of $\delta\omega$, the additional sidebands are driven non-resonantly. Consequently, effects of the additional sidebands on the overall OPA process are typically relatively weak and, for all practical purposes, can be substantially ignored.

One skilled in the art will appreciate that the designation of the various optical waves in FIGS. 1 and 2 as pumps, signals, and/or idlers is intended to explain the physical principles that govern different FWM processes, rather than to limit the implementation of each of those processes to any particular pump(s)/signal/idler configuration. In an embodiment, the physical pump(s) may be configured so that any of the peaks in the light intensity versus frequency structures shown in FIGS. 1 and 2 can be configured to have a relatively high intensity and serve as a pump wave for a desired nonlinear optical process. For example, in the MI process of FIG. 2 (see also Eq. (2)), a relatively weak optical communication signal can have frequency $\omega_1$ and be coupled to two relatively strong pump waves having frequencies $\omega_{1-}$ and $\omega_{1+}$, respectively. Hereafter, an optical process corresponding to this pumps/signal configuration is referred to as inverse MI. Other pump(s)/signal/idler designations in the frequency structures corresponding to the MI, BS, and PC processes of FIG. 2 are also possible.

Optical Parametric Device

Figure 3:
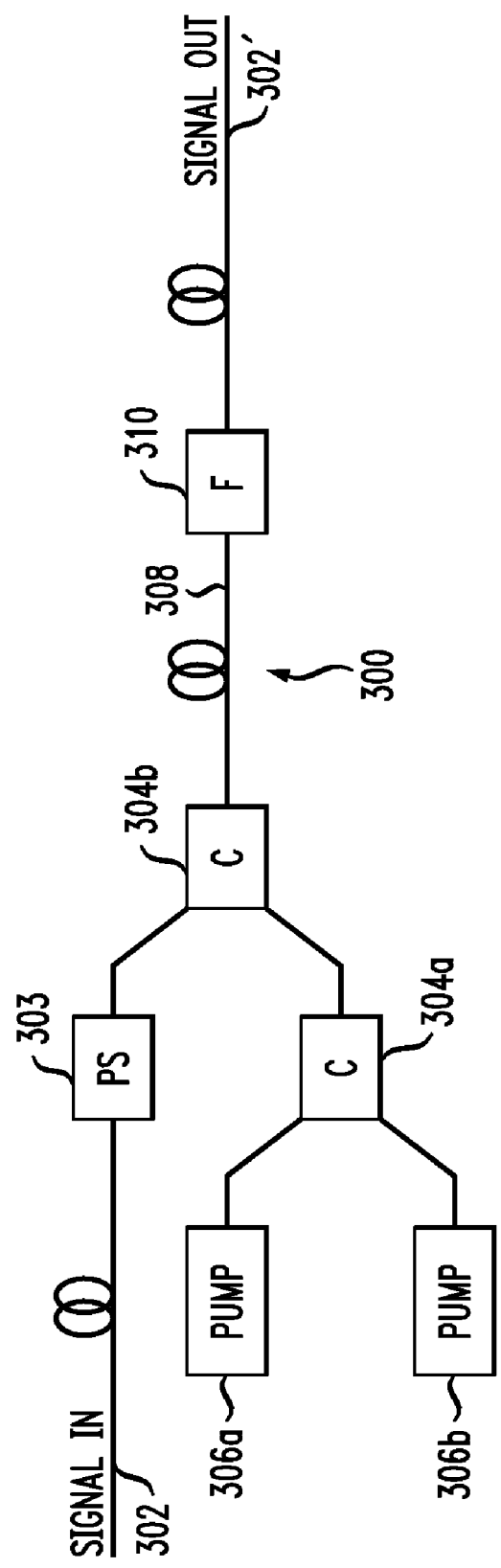
FIG. 3 shows an optical parametric device (OPD), in which various optical parametric processes illustrated in FIGS. 1 and 2 can occur according to various embodiments of the invention.

FIG. 3 shows an optical parametric device (OPD) 300, in which various FWM processes illustrated in FIGS. 1 and 2 can occur according to various embodiments of the invention. OPD 300 may be coupled between two sections 302 and 302' of an optical transmission fiber and has optical couplers 304a-b configured to combine an optical communication signal from section 302 with pump light waves generated by pump-wave sources (e.g., lasers) 306a and 306b. The two pump light waves are combined together using coupler 304a, and the resulting light wave is then combined with the optical communication signal using optical coupler 304b. Optical couplers 304a-b incorporate polarization filters as appropriate and/or necessary to provide a desired polarization configuration, e.g., one of those described in the subsequent sections. In another embodiment, a three-way optical coupler may be used to combine the optical communication signal with the pump waves. In general, as long as the two pump light waves and the optical communication signal are coupled into a nonlinear fiber (NLF) or nonlinear planar optical waveguide (NPOW) 308, they can be combined in any combination/sequence. Depending on the implementation of OPD 300, the pump light waves may be continuous-wave (CW) or pulsed optical signals.

The optical communication signal interacts with the pump light waves in NLF or NPOW 308, e.g., as described in the subsequent sections, and is amplified, attenuated, and/or frequency converted due to this interaction. A filter 310 placed at the end of NLF or NPOW 308 separates a desired optical output signal from the other optical signals present in the NLF or NPOW for further transmission in the communication system via section 302'. Note that all relevant light waves (e.g., the optical communication signal, the two pump light waves, and their different polarization components) propagate in NLF or NPOW 308 along the same (common) longitudinal direction, i.e., from optical coupler 304b toward optical filter 310.

In one embodiment, OPD 300 has an optional optical phase shifter (PS) 303 inserted into section 302 before optical coupler 304b. Optical phase shifter 303 is adapted to controllably change the phase of the optical communication signal to enable OPD 300 to take advantage of the phase sensitivity of certain FWM processes occurring in NLF or NPOW 308. For example, optical phase shifter 303 can be tuned to adjust the phase of the optical communication signal so as to change (as desirable) the amount of amplification or attenuation imparted onto that signal in NLF or NPOW 308.

In one embodiment, NLF or NPOW 308 is a birefringent optical medium. The anisotropy of NLF or NPOW 308 that results in birefringence can be created, e.g., by shaping the optical fiber core so that it has an elliptical cross-section. For an optical-wave polarization that is parallel to either the short axis or the long axis of the ellipse, NLF or NPOW 308 behaves as if it had a single effective refractive index. However, for other polarizations, propagation of the corresponding optical wave and its interaction with the fiber material can be described as if the optical wave consisted of two polarization components, each experiencing a different corresponding refractive index. The component that experiences the higher effective refractive index is referred to as the slow wave, and the component that experiences the lower effective refractive index is referred to as the fast wave.

In various embodiments, optical birefringence can be created in many different ways, such as: (1) fabricating the optical-waveguide or fiber core from an appropriate anisotropic material; (2) shaping the optical-waveguide or fiber core to have an arbitrary non-circular cross-section; (3) stressing or straining the optical-waveguide or fiber core in a transverse direction; and/or (4) applying an electric or magnetic field to the optical-waveguide or fiber core. One skilled in the art will appreciate that the mathematical formalism for describing optical birefringence remains substantially the same regardless of the specific physical cause of birefringence. For example, the optical-waveguide or fiber core can be characterized by two mutually orthogonal, transverse axes corresponding to the polarizations of the fast and slow light waves, respectively. Hereafter, these axes are referred to as the "birefringence axes." For NLF or NPOW 308 having an elliptical cross-section, the birefringence axes are (1) the axis that is parallel to the short axis of the ellipse and (2) the axis that is parallel to the long axis of the ellipse. In the description that follows, if not explicitly stated otherwise, the polarization angles of various optical waves are given with respect to the birefringence axes of NFL or NPOW 308.

Wave Propagation in a Birefringent Fiber

Optical-wave propagation in a birefringent optical waveguide or fiber, such as NLF or NPOW 308 (FIG. 3), can be modeled by the coupled Schrodinger equations (CSEs) (5a-b):

$$\partial_z X = i\beta_x(i\partial_\tau)X + i(\gamma_s|X|^2 + \gamma_c|Y|^2)X \quad (5a)$$

$$\partial_z Y = i\beta_y(i\partial_\tau)Y + i(\gamma_c|X|^2 + \gamma_s|Y|^2)Y \quad (5b)$$

where z is the distance along the longitudinal axis of the fiber; $\partial_z \equiv \partial/\partial_z$; X and Y are the amplitudes of the x and y polarization components, respectively; $\beta_x$ and $\beta_y$ are the corresponding dispersion functions of the fiber; $\gamma_s = \gamma_K$ is the self-nonlinearity coefficient, where $\gamma_K$ is the Kerr coefficient; and $\gamma_c = 2\gamma_K/3$ is the cross-nonlinearity coefficient. In the frequency domain, $$\beta(\omega) = \sum_{n \geq 1} \beta_n(\omega_c)\omega^n / n!,$$

where $\omega_c$ is the carrier frequency of the wave and $\omega$ is the difference between the actual and carrier frequencies. To convert from the frequency domain to the time domain, one replaces $\omega$ by $i\partial_\tau$, where $\tau \equiv t - \beta_a z$ is the retarded time and $\beta_a = [\beta_{1x}(\omega_c) + \beta_{1y}(\omega_c)]/2$ is the average of the group slownesses (wherein the group slowness is the inverse group velocity).

Adjacent Waves

Let us suppose that the frequencies of all relevant optical waves are close to (e.g., within about 1 THz from) the ZDF.

Then, the effects of the second- and higher-order dispersion are relatively small and can be neglected. As a result, the CSEs (5a-b) reduce to the coupled-component equations (CCEs) (6a-b):

$$(\partial_z + \beta_d \partial_t) X = i(\gamma_s |X|^2 + \gamma_c |Y|^2) X \quad (6a)$$

$$(\partial_z - \beta_d \partial_t) Y = i(\gamma_c |X|^2 + \gamma_s |Y|^2) Y \quad (6b)$$

where $\beta_d = [\beta_{1x}(\omega_c) - \beta_{1y}(\omega_c)]/2$ is the walk-off parameter defined as the difference between the group slownesses. It follows from CCEs (6a-b) that:

$$(\partial_z + \beta_d \partial_t) P_x = 0 \quad (7a)$$

$$(\partial_z - \beta_d \partial_t) P_y = 0 \quad (7b)$$

where $P_x = |X|^2$ and $P_y = |Y|^2$. This means that the power of each component is constant in a frame moving with the group velocity of that component and no power is exchanged between the components.

After defining the retarded times $\tau_x = \tau - \beta_d z$ and $\tau_y = \tau + \beta_d z$, one can solve Eqs. (7a-b), using the method of characteristics, to find that:

$$X(\tau_x, z) = X(\tau_x, 0) \exp\left\{ i\gamma_s P_x(\tau_x, 0) z + i\gamma_c \int_0^z P_y(\tau_x + 2\beta_d z', 0) dz' \right\} \quad (8a)$$

$$Y(\tau_y, z) = Y(\tau_y, 0) \exp\left\{ i\gamma_c \int_0^z P_x(\tau_y - 2\beta_d z', 0) dz' + i\gamma_s P_y(\tau_y, 0) z \right\} \quad (8b)$$

Note that Eq. (8b) can be deduced from Eq. (8a) by interchanging the subscripts x and y and changing the sign of the walk-off parameter $\beta_d$. For multiple-frequency inputs, the self- and cross-nonlinearities in Eqs. (8a-b) have time-independent parts, which produce self-phase modulation (SPM) and cross-phase modulation (CPM), respectively, and time-dependent parts, which produce scalar and vector FWM. The SPM and scalar FWM involve X and $P_x$, or Y and $P_y$, whereas the CPM and vector FWM involve X and $P_y$, or Y and $P_x$. The effects of SPM and scalar FWM accumulate with distance, as do the effects of CPM. However, the effects of vector FWM, which depend on an integral of a periodic function, are bounded and therefore can be neglected at relatively large propagation distances. Apart from the CPM, which produces only time-independent phase shifts, the polarization components can evolve nearly independently.

Figure 4A:
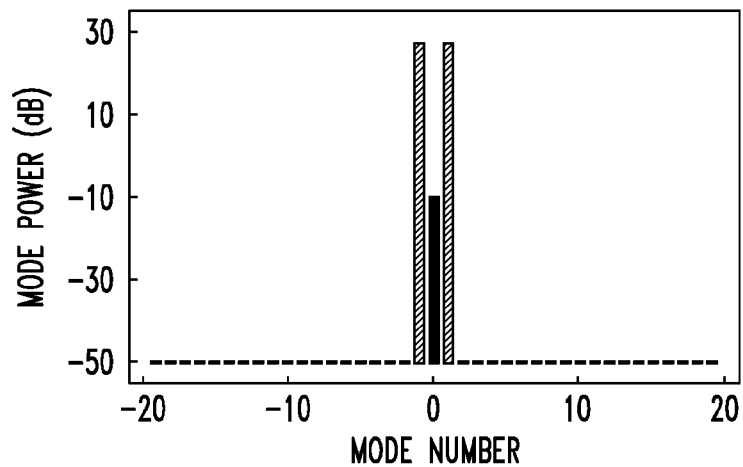
FIGS. 4A-C graphically show a simulated generation of an exemplary cascade of frequencies in the OPD of FIG. 3.
Figure 4B:
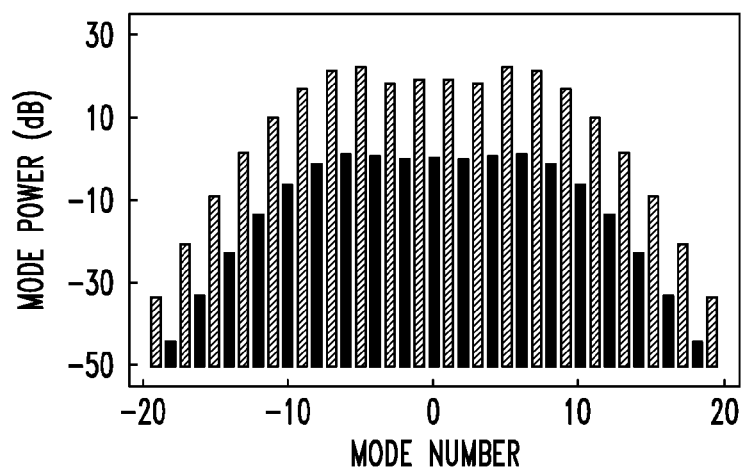
Figure 4C:
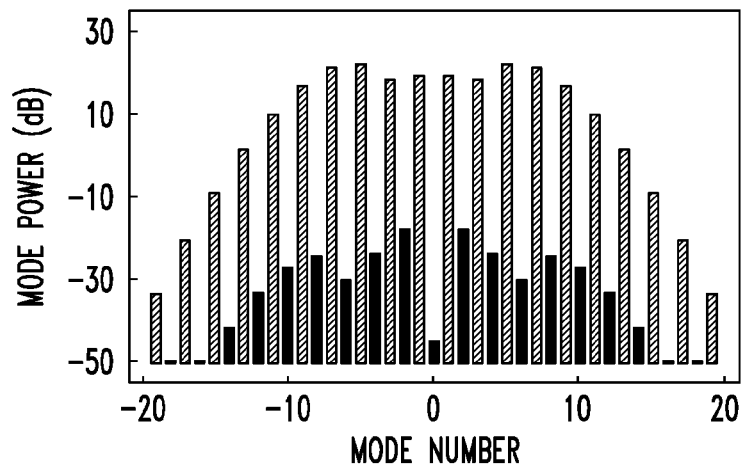

Of interest to this section is a case of inverse MI, in which there are (i) two relatively strong pump waves (denoted as modes number −1 and 1, respectively) that are linearly polarized at 45 degrees and (ii) a relatively weak input signal (denoted as mode number 0) that is linearly polarized at an arbitrary angle. Note that the polarization of the pump waves can be parallel or anti-parallel with respect to each other. The pump waves may have substantially equal power. The signal frequency is the average of the pump frequencies, i.e., $\omega_0 = (\omega_1 + \omega_{-1})/2$ (see also Eq. (2)). These input conditions can be expressed by Eq. (9):

$$X(\tau, 0) = \rho \exp(i\phi_{-1}) + \rho_{0x} \exp(i\phi_0) + \rho \exp(i\phi_1) \quad (9)$$

where $\rho$ is an x-axis projection of the pump-wave amplitude; $\rho_{0x}$ is an x-axis projection of the signal amplitude; and $\phi_{-1}$, $\phi_0$, and $\phi_1$ are the input phases of the first pump wave, signal, and second pump wave, respectively. Eq. (9) can also be rewritten as follows:

$$X(\tau, 0) = \rho \exp(i\omega_d \tau_x) + \rho_{0x} \exp(i\phi_0) + \rho \exp(-i\omega_d \tau_x) \quad (10)$$

where $\omega_d = (\omega_1 - \omega_{-1})/2$ is the frequency difference between the frequency-cascade orders (see also FIGS. 4A-C); $\phi_a = [\phi_1(0) + \phi_{-1}(0)]/2$ is the pump-wave phase average; and $\phi_d = [\phi_1(0) - \phi_{-1}(0)]/2$ is the pump-wave phase difference divided by two. Note that, in Eq. (10), the frequency is measured relative to average frequency $\omega_0$; the phase is measured relative to phase $\phi_a$; and time is measured relative to the reference time expressed as $\phi_d/\omega_d$.

With three input frequencies, different FWM processes can produce a cascade of frequencies in addition to the three initial frequencies. One such cascade is described in the above-cited U.S. Pat. No. 7,164,526. Likewise, for the initial conditions expressed by Eqs. (9)-(10), a cascade of frequencies mutually coupled by different FWM processes may be generated. Adjacent frequencies in the cascade are separated by $\omega_d$ and, as a result, different frequencies in the cascade can be referred to as "harmonics." It is convenient to refer to each of these harmonics as a mode assigned a corresponding order number. As already indicated above, the two initial pump waves are modes number −1 and 1, and the input signal is mode number 0.

FIGS. 4A-C graphically show an example of a generation of a cascade of frequencies in NLF or NPOW 308. More specifically, FIG. 4A shows the three optical input light waves described by Eqs. (9) and (10), with about 20-dB power difference between the input optical signal and a pump light wave ($\rho=22.4$ and $\rho_0=0.316$). FIGS. 4B-C show resulting cascades for two different values (0.124 and 1.69 radians (rad), respectively) of phase $\phi_0$.

FIGS. 4B-C demonstrate that, in each of the cascades, the newly-generated odd harmonics may have relatively high intensities and represent secondary pump waves. The even, non-zero-order harmonics have relatively low intensities and represent idlers. As expected, the intensities of the two original pump waves (modes number −1 and 1) are reduced due to the energy transfer to the other harmonics in the cascade. FIGS. 4B-C also demonstrate that, depending on the value of phase $\phi_0$, the signal (mode number 0) can be amplified or attenuated, thereby proving that inverse MI in a birefringent fiber is a phase-sensitive process. For example, for $\phi_0=0.124$ rad, the signal is amplified by about 10 dB (see FIGS. 4A-B). In contrast, for $\phi_0=1.69$ rad, the signal is attenuated by about 35 dB (see FIGS. 4A and 4C).

A more-general description of the cascade(s) generated with the three input waves described by Eqs. (9) and (10) is given by Eq. (11) (which describes the x-polarization component) and an analogous equation (which is not explicitly given below) for the y-polarization component:

$$X(\tau_x, z) = \sum_n X_n(z) \exp[-in\omega_d \tau_x + i\psi_x] \quad (11)$$

where n is the mode number; $\psi_x$ is a time-independent phase expressed by Eq. (12):

$$\psi_x = 2(\gamma_s + \gamma_c)\rho^2 z + (\gamma_s \rho_{0x}^2 + \gamma_c \rho_{0y}^2) z \quad (12)$$

and harmonics $X_n$ of the cascade are given by Eq. (13):

$$X_n(\zeta) = \sum_m i^{n-m} J_m(\zeta) [\rho_{0x} \exp(i\phi_0) J_{n-2m}(\varepsilon_x \zeta) - 2i\rho (J')_{n-2m}(\varepsilon_x \delta)] \quad (13)$$

where $\zeta = 2\rho^2 z$; $\varepsilon_x = 2(\rho_{0x}/\rho)\cos\phi_0$; $J'_l(y) = dJ_l(y)/dy$; and $J_l$ is the Bessel function of the first kind, of order l.

Eq. (11) and its Y analog show that the output harmonics may depend on the polarization of the input signal in two ways: First, because $\gamma_s \neq \gamma_c$, the polarization components experience different phase shifts. Second, the polarization components depend nonlinearly on $\epsilon_j(\rho_{0j})$. However, in a linear regime corresponding to $\epsilon_j\zeta \ll 1$, the signal-induced phase shifts are typically negligible, the odd harmonics do not depend on $\rho_{0j}$, and the even harmonics may be all proportional to $\rho_{0j}$.

In the linear regime, for even n, the exact solution given by Eq. (13) can be approximated by Eq. (14):

$$X_n(\zeta) \approx i^{n/2}\rho_{0x}\{J_{n/2}(\zeta)[\exp(i\phi_0)+2i\zeta\cos\phi_0]+J'_{n/2}(\zeta)2\zeta\cos\phi_0\} \quad (14)$$

Eq. (14) indicates that every contribution to $X_n$ is proportional to $\rho_{0x}$, which also means that every contribution to $Y_n$ is proportional to $\rho_{0y}$. Both x and y polarization components have the same dependence on $\phi_0$. Hence, the output-signal and idler powers may depend on the input-signal phase, but not on the input-signal polarization, meaning that, in the linear regime, polarization-independent phase-sensitive amplification is possible.

For the signal mode (n=0), Eq. (14) can be written in the input-output form as follows:

$$X_0(\zeta) \approx \rho_0[\mu(\zeta)\exp(i\phi_0)+\nu(\zeta)\exp(-i\phi_0)] \quad (15)$$

where $\mu(\zeta)=J_0(\zeta)+\zeta J'_0(\zeta)+i\zeta J_0(\zeta)$ and $\nu(\zeta)=\zeta J'_0(\zeta)+i\zeta J_0(\zeta)$ are transfer functions. The signal power attains its extreme values when $2\phi_m = \tan^{-1}[(\mu_r\nu_i - \mu_i\nu_r)/(\mu_r\nu_r + \mu_i\nu_i)]$, where the subscripts r and i denote the real and imaginary parts, respectively, of the corresponding transfer function. The first-quadrant value of $2\phi_m$ corresponds to a maximum gain of $(|\mu|^2+|\nu|^2)$, whereas the third-quadrant value of $2\phi_m$ corresponds to a minimum gain of $(|\mu|-|\nu|)^2$. Using the aforementioned expressions for the transfer functions, one further finds that:

$$2\phi_m(\zeta) = \tan^{-1}\left\{\frac{J_0^2(\zeta)}{\zeta[J_0^2(\zeta)+J_1^2(\zeta)] - J_0(\zeta)J_1(\zeta)}\right\} \quad (16)$$

Figure 5A:
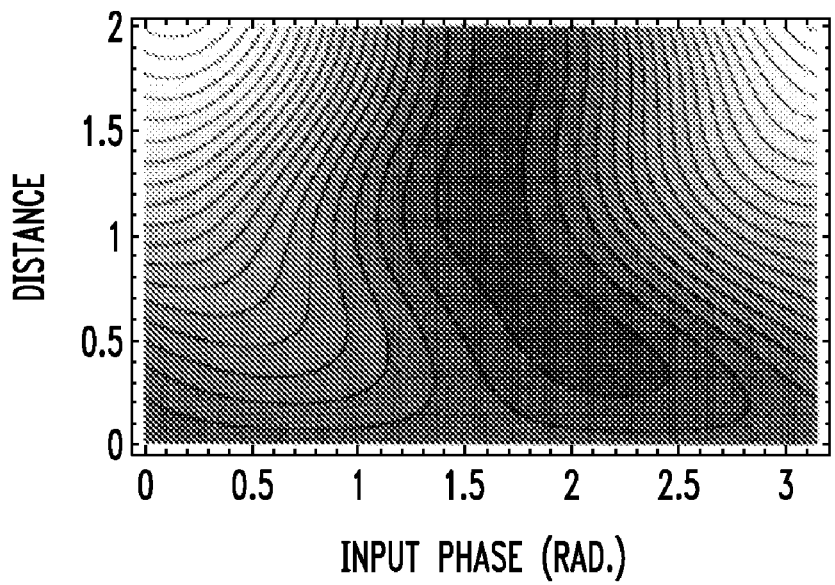
FIGS. 5A-B graphically show predicted and simulated signal gain as a function of the input-signal phase and effective distance along the nonlinear fiber for an exemplary configuration corresponding to FIG. 4.
Figure 5B:
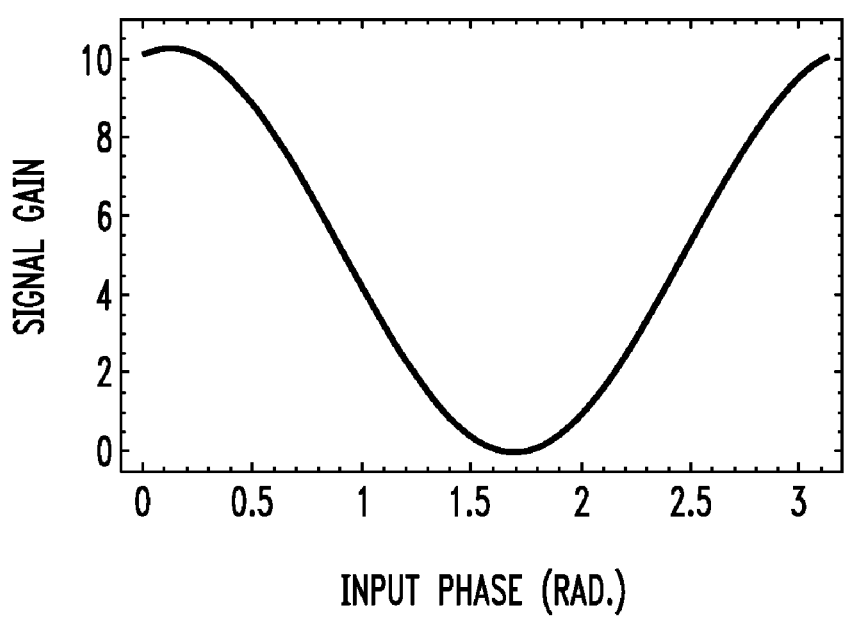

FIGS. 5A-B graphically show the signal gain calculated using Eq. (15) as a function of phase $\phi_0$ and effective distance $(\gamma_s\rho^2 z)$ along exemplary NLF 308. More specifically, FIG. 5A shows a contour plot of the gain, with contour spacing of 0.5. FIG. 5B shows a slice of the contour plot of FIG. 5A at $\gamma_s\rho^2 z=2.0$. FIG. 5A indicates that, for relatively short effective distances, the signal gain is (i) at a maximum when phase $\phi_0$ is about $\pi/4$ and (ii) at a minimum when phase $\phi_0$ is about $3\pi/4$. As the effective distance increases, phases $\phi_0$ corresponding to the maximum and minimum gains tend (non-monotonically) to 0 and $\pi/2$, respectively. FIG. 5B indicates that, for $\gamma_s\rho^2 z=2.0$, phases $\phi_0$ corresponding to the maximum and minimum gains are 0.124 and 1.69 rad, respectively.

To confirm the above-described theoretical predictions, scalar (one-polarization) and vector (two-polarization) numerical simulations were performed based directly on CSEs (5a-b), for $\beta_3=0.03$ ps$^3$/Km, $\beta_4=-0.0003$ ps$^4$/Km, $\gamma_s=10$/Km-W, the pump powers $P_x=P_y=0.5$ W, and the signal powers $P_{sx}=0.08$ mW and $P_{sy}=0.02$ mW (which correspond to the pump and signal amplitudes of FIGS. 4A-C). The average pump frequency was the ZDF, and the signal-pump frequency difference was about 0.31 Tr/s ($\approx$50 GHz).

Figure 6A:
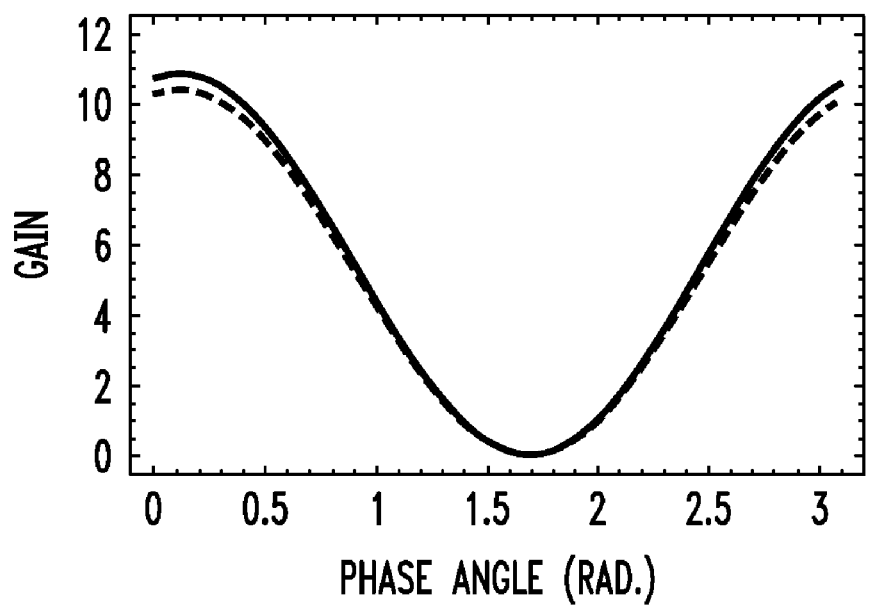
FIGS. 6A-B graphically show predicted and simulated signal gain as a function of the input-signal phase and polarization angle for an exemplary configuration corresponding to FIG. 4.
Figure 6B:
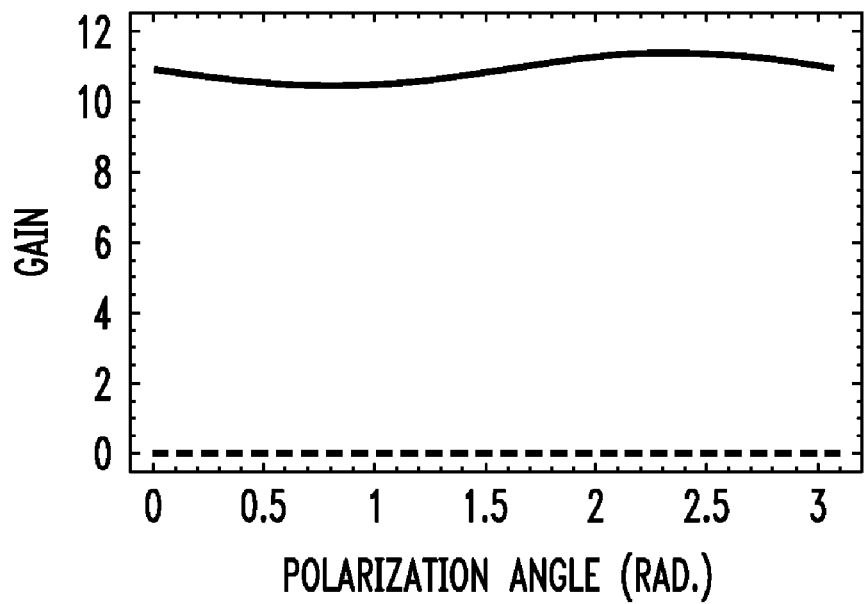

FIGS. 6A-B graphically show simulation results for the signal gain as a function of the phase and polarization angle. FIG. 6A is generally analogous to FIG. 5B and shows the signal gain for two different signal polarizations: (1) 0 degrees—the solid curve and (2) 45 degrees—the dashed curve. FIG. 6B shows the signal gain plotted as a function of the polarization angle for $\phi_0=0.124$ rad (solid curve) and $\phi_0=1.69$ rad (dashed curve). As can be seen in FIG. 6B, the signal gain variation with the polarization angle does not exceed about 10%.

Thus, for inverse modulation interaction (a degenerate FWM process) in a birefringent fiber with optical-wave frequencies near the zero-dispersion frequency (ZDF) of the fiber, the birefringence may decouple the evolution of the x and y components of the optical waves, where x and y denote the birefringence axes of the optical fiber or optical waveguide. If the two pump light waves are linearly polarized at about 45 degrees to the birefringence axes, then the phase-sensitive amplification (or attenuation) experienced by a linearly-polarized signal may be substantially independent of the signal-polarization angle. Because the effects of dispersion may be relatively weak in the vicinity of the ZDF, secondary FWM processes may produce a cascade of relatively strong secondary pumps and idlers that need to be filtered out at the output of the OPD.

Distant Waves

If the optical-wave frequencies are not all close to the ZDF and/or each other, then the effects of dispersion may become significant and non-negligible. As a result, separate equations for each polarization and frequency component ought to be considered to describe the wave interaction. In this section, index j=1, 2, 3, 4 is used to denote different optical waves coupled by an FWM process. By substituting the ansätze given by Eqs. (17)-(18):

$$X(t,z) = \sum_{j=1}^{4} X_j(z)\exp(-\omega_j t) \quad (17)$$

$$Y(t,z) = \sum_{j=1}^{4} Y_j(z)\exp(-\omega_j t) \quad (18)$$

into the CSEs (5a-b) and collecting the terms of like frequency, one finds that:

$$\partial_z X_1 = i\beta_x(\omega_1)X_1 + i\gamma_s(|X_1|^2 + 2|X_2|^2 + 2|X_3|^2 + 2|X_4|^2)X_1 + \quad (19)$$
$$i\gamma_s X_3^* X_2^2 + i2\gamma_s X_4^* X_2 X_3 + i\gamma_c(|Y_1|^2 + |Y_2|^2 + |Y_3|^2 + |Y_4|^2)X_1 +$$
$$i\gamma_c Y_1(Y_2^* X_2 + Y_3^* X_3 + Y_4^* X_4) + i\gamma_c Y_3^* Y_2 X_2 + i\gamma_c Y_4^*(Y_2 X_3 + Y_3 X_2)$$

$$\partial_z X_2 = i\beta_x(\omega_2)X_2 + i\gamma_s(|X_2|^2 + 2|X_3|^2 + 2|X_4|^2 + 2|X_1|^2)X_2 + \quad (20)$$
$$i2\gamma_s X_2^* X_3 X_1 + i\gamma_s X_4^* X_3^2 + i2\gamma_s X_3^* X_4 X_1 +$$
$$i\gamma_c(|Y_2|^2 + |Y_3|^2 + |Y_4|^2 + |Y_1|^2)X_2 + i\gamma_c Y_2(Y_3^* X_3 + Y_4^* X_4 + Y_1^* X_1) +$$
$$i\gamma_c Y_2^*(Y_3 X_1 + Y_1 X_3) + i\gamma_c Y_4^* Y_3 X_3 + i\gamma_c Y_3^*(Y_4 X_1 + Y_1 X_4)$$

The first term on the right side of Eq. (19) represents a linear phase shift caused by dispersion, whereas the second and fifth terms represent nonlinear phase shifts caused by SPM and CPM. The third and fourth terms represent scalar FWM processes in which $2\pi_{2x} \leftrightarrow \pi_{3x}+\pi_{1x}$ and $\pi_{2x}+\pi_{3x} \leftrightarrow \pi_{4x}+\pi_{1x}$, respectively, where $\pi_{jk}$ denotes a photon with frequency $\omega_j$ that is polarized parallel to the k axis. The seventh term represents a vector FWM process in which $\pi_{2x}+\pi_{2y} \leftrightarrow \pi_{3y}+\pi_{1x}$, and the eighth term represents a vector FWM process in which $\pi_{2y}+\pi_{3x} \leftrightarrow \pi_{4y}+\pi_{1x}$ and $\pi_{2y}+$ $\pi_{3x} \leftarrow \rightarrow \pi_{4y} + \pi_{1x}$. The sixth term represents a process in which $\pi_{1x} + \pi_{2y} \leftarrow \rightarrow \pi_{1y} + \pi_{2x}$, and similar processes that involve waves 3 and 4. Analyses show that the latter processes are cross-polarization rotations (CPRs). Similar statements apply to the various terms of Eq. (20).

Note that Eqs. (19)-(20) have been derived for a special case of $\omega_2 - \omega_1 = \omega_3 - \omega_2 = \omega_4 - \omega_3$. Similar equations may apply to a case, with more general frequencies. The equations for $Y_1$ and $Y_2$ can be deduced from Eqs. (19)-(20), respectively, by interchanging $X_j$ and $Y_j$. The equations for $A_3$ and $A_4$ (where A is X or Y) can be deduced from the equations for $A_1$ and $A_2$ by interchanging indices 1 and 4 and interchanging indices 2 and 3, respectively. Collectively, all these equations are referred to as the coupled-mode equations (CMEs).

Let us define the total x- and y-polarized powers $P_x = \Sigma_{j=1}^4 |X_j|^2$ and $P_y = \Sigma_{j=1}^4 |Y_j|^2$, respectively. Phase shifts do not change $P_x$ and $P_y$. Scalar FWM processes exchange energy between different x-polarized components or different y-polarized components. The photon-exchange equations show that, in each CPR and vector-FWM process, x- and y-polarized photons may be destroyed and other x- and y-polarized photons may be created. Hence, the CMEs conserve $P_x$ and $P_y$, as do CCEs (6a-b).

For parameters that may be typical of operating conditions in OPD 300, $\beta(\omega) = \Sigma_{n \geq 1} \beta_n \omega^n / n! \approx \beta_1 \omega$, where $\omega$ is the frequency of any optical wave (measured relative to a reference frequency, such as the ZDF). Let $X_j(z) = \overline{X}_j(z) \exp(i\beta_{1x} \omega_j z)$ and $Y_j(z) = \overline{Y}_j(z) \exp(i\beta_{1y} \omega_j z)$, where $\beta_{1x} = \beta_d$ and $\beta_{1y} = -\beta_d$. By making the corresponding substitutions in Eqs. (19)-(20), one obtains modified equations for $\overline{X}_j$ and $\overline{Y}_j$. The SPM and CPM terms in Eq. (19) are unaffected by this change of variables. The scalar FWM terms are multiplied by the phase factors $\exp[i\beta_d(2\omega_2 - \omega_3 - \omega_1)]$ and $\exp[i\beta_d(\omega_2 + \omega_3 - \omega_4 - \omega_1)]$, both of which equal unity when the frequency-matching conditions are satisfied. Then, the CPR terms are multiplied by the phase factors $\exp[i2\beta_d(\omega_j - \omega_1)]$, the spatial average of which is about zero. Also, the vector FWM terms will be multiplied by the phase factors $\exp[-i\beta_d(\omega_3 - \omega_1)]$, $\exp[-i2\beta_d(\omega_3 - \omega_1)]$, and $\exp[-i2\beta_d(\omega_2 - \omega_1)]$, the averages of which are about zero. Similar statements will typically apply to the terms in the modified version of Eq. (20). Hence, one can replace Eqs. (19) and (20) by the corresponding reduces Eqs. (21) and (22), respectively:

$$\partial_z X_1 \approx i\beta_x(\omega_1)X_1 + i\gamma_s(|X_1|^2 + 2|X_2|^2 + 2|X_3|^2 + 2|X_4|^2)X_1 + \quad (21)$$
$$i\gamma_s X_3^* X_2^2 + i2\gamma_s X_4^* X_2 X_3 + i\gamma_c(|Y_1|^2 + |Y_2|^2 + |Y_3|^2 + |Y_4|^2)X_1$$

$$\partial_z X_2 \approx i\beta_x(\omega_2)X_2 + \quad (22)$$
$$i\gamma_s(|X_2|^2 + 2|X_3|^2 + 2|X_4|^2 + 2|X_1|^2)X_2 + i2\gamma_s X_2^* X_3 X_1 +$$
$$i\gamma_s X_4^* X_3^2 + i2\gamma_s X_3^* X_4 X_1 + i\gamma_c(|Y_2|^2 + |Y_3|^2 + |Y_4|^2 + |Y_1|^2)X_2$$

where the dispersion functions $\beta(\omega) = \Sigma_{n \geq 2} \beta_n \omega^n / n!$ contain only second- and higher-order dispersion terms, and the bars are omitted for simplicity.

As stated above, the total powers $P_x$ and $P_y$ are conserved. Let $X_j(z) = \hat{X}_j(z) \exp[i(2\gamma_s P_x + \gamma_c P_y)z]$ and $Y_j(z) = \hat{Y}_j(z) \exp[i(\gamma_c P_x + 2\gamma_s P_y)z]$. For each polarization, every frequency component has about the same phase shift. By making the corresponding substitutions in Eqs. (21) and (22), one can remove the terms that produce this common shift, and obtains reduced Eqs. (23) and (24):

$$\partial_z X_1 \approx i\beta_x(\omega_1)X_1 - i\gamma_s|X_1|^2 X_1 + i\gamma_s X_3^* X_2^2 + i2\gamma_s X_4^* X_2 X_3 \quad (23)$$

$$\partial_z X_2 \approx i\beta_x(\omega_2)X_2 - i\gamma_s|X_2|^2 X_2 + i2\gamma_s X_2^* X_3 X_1 + i\gamma_s X_4^* X_3^2 + i2\gamma_s X_3^* X_4 X_1 \quad (24)$$

where the carets are omitted for simplicity. Eqs. (23) and (24) describe scalar FWM processes in which $2\pi_{2x} \leftarrow \rightarrow \pi_{3x} + \pi_{1x}$, $\pi_{2x} + \pi_{3x} \leftarrow \rightarrow \pi_{4x} + \pi_{1x}$, and $2\pi_{3x} \leftarrow \rightarrow \pi_{4x} + \pi_{2x}$. Similar equations should apply to the y-components of waves 1 and 2, and the x- and y-components of waves 3 and 4. These reduced CMEs imply that the x- and y-components of the waves evolve independently. Similar (reduced) CMEs can be derived for larger collections of waves (e.g., harmonics).

Eqs. (23) and (24) do not describe the vector FWM process associated with the seventh term on the right side of Eq. (19) and the eighth term on the right side of Eq. (20). In these processes, which are often called the CPM instability, a pump polarized at 45 degrees to the birefringence axes derived an x-polarized sideband and a y-polarized sideband. Let $\omega$ denote the frequency difference between the x-polarized sideband and the pump. Then, the dispersive contribution to the wavenumber mismatch is $(\beta_{1x} - \beta_{1y})\omega + (\beta_{2x} + \beta_{2y})\omega^2/2$. Phase matching only occurs for large frequency differences, for which the first two terms in the dispersion functions have the same magnitude. We have omitted such frequencies from our analysis.

It is instructive to analyze the initial evolution of the FWM processes described by Eqs. (23) and (24).

First, consider the MI $2\pi_2 \rightarrow \pi_3 + \pi_1$, in which two photons from a strong pump (j=2) are destroyed and two sideband, or signal and idler, photons (j=3 and 1) are created ($\pi_j$ is an abbreviation for $\pi_{jx}$). By linearizing Eqs. (23) and (24), one obtains input-output Eqs. (25)-(26):

$$X_1(z) = \mu(z)X_1(0) + \nu(z)X_3^*(0) \quad (25)$$

$$X_3^*(z) = \nu^*(z)X_1(0) + \mu^*(z)X_3^*(0) \quad (26)$$

in which the transfer functions are expressed as follows:

$$\mu(z) = \cos(kz) + i(\delta/k)\sin(kz) \quad (27)$$

$$\nu(z) = i(\overline{\gamma}/k)\sin(kz) \quad (28)$$

where the wavenumber-mismatch parameter $\delta = [\beta(\omega_3) + \beta(\omega_1) - 2\beta(\omega_2)]/2 + \gamma_s P_2$, the coupling parameter $\overline{\gamma} = \gamma_s P_2$, and the MI wavenumber $k = (\delta^2 - \overline{\gamma}^2)^{1/2}$. The MI amplifies the signal whenever $\overline{\gamma} > |\delta|$. If the modulation frequency $\omega_2 - \omega_1$ is low, then only second-order dispersion is important and the instability criterion typically requires the pump frequency to be in the anomalous-dispersion regime [$\beta_2(\omega_2) < 0$].

Second, consider the inverse MI $\pi_3 + \pi_1 \rightarrow 2\pi_2$, in which photons from two relatively strong pumps (j=3 and 1) are destroyed and two signal photons (j=2) are created. The inverse MI is characterized by the input-output Eq. (29):

$$X_2(z) = \mu(z)X_2(0) + \nu(z)X_2^*(0) \quad (29)$$

where the transfer functions are given by Eqs. (27) and (28), $\delta = [2\beta_2(\omega_2) + \beta(\omega_3) - \beta(\omega_1)]/2 + \gamma_s(P_1 + P_3)/2$, and $\overline{\gamma} = 2\gamma_s(P_1 P_3)^{1/2}$. The inverse MI also leads to signal amplification whenever $\overline{\gamma} > |\delta|$. When one compares the formulas for the MI and inverse MI, one finds that the dispersive contributions to the mismatch parameters have opposite signs and the coupling parameters differ by about a factor of 2. Hence, if the modulation frequency is low, then the inverse MI can exist when the pump frequency is in the anomalous- and normal-dispersion regions. The MI amplification can occur when the pump frequency is in the latter region [$\beta_2(\omega_2) < 0$].

Third, consider a PC process $\pi_2 + \pi_3 \rightarrow \pi_4 + \pi_1$, in which photons from two relatively strong pumps (j=2 and 3) are destroyed, and signal and idler photons (j=4 and 1) are created. The PC process may be characterized by input-output Eqs. (30) and (31):

$$X_1(z) = \mu(z)X_1(0) + \nu(z)X_4^*(0) \quad (30)$$

$$X_4^*(z) = \nu^*(z)X_1(0) + \mu^*(z)X_4^*(0) \quad (31)$$

where the transfer functions were defined in Eqs. (27) and (28), $\delta = [\beta(\omega_4) + \beta(\omega_1) - \beta_2(\omega_2) - \beta(\omega_3)]/2 + \gamma_s(P_2 + P_3)/2$, and $\bar{\gamma} = 2\gamma_s(P_2P_3)^{1/2}$. The PC process is also prone to providing amplification when $\bar{\gamma} > |\delta|$. It is suitable for amplification when the average of the pump frequencies is in the anomalous-dispersion region [$\beta(\omega_a) > 0$, where $\omega_a = (\omega_2 + \omega_3)/2$].

Fourth, consider a BS process $\pi_2 + \pi_3 \to \pi_4 + \pi_1$, in which photons from a relatively strong pump (j=3) and a relatively weak signal (j=2) are destroyed, and pump (j=1) and idler (j=4) photons are created. Then, the photon-exchange equations for BS and PC typically have the same form, but the identities of the pumps and sidebands are different. The BS process may be characterized by input-output Eqs. (32) and (33):

$$X_2(z) = \mu(z)X_2(0) + \nu(z)X_4(0) \quad (32)$$

$$X_4(z) = -\nu^*(z)X_2(0) + \mu^*(z)X_4(0) \quad (33)$$

where the transfer functions were defined in Eqs. (27) and (28), $\delta = [\beta(\omega_2) + \beta(\omega_3) - \beta_4(\omega_2) - \beta(\omega_1)]/2 + \gamma_s(P_1 - P_3)/2$, $\bar{\gamma} = 2\gamma_s(P_1P_3)^{1/2}$, and $k = (\delta^2 + \bar{\gamma}^2)^{1/2}$. The BS process provides coupling, but typically no amplification. If the pump powers are equal ($P_1 = P_3$), then a complete transfer of power from the signal to the idler may occur when the average of the signal frequency and the higher pump frequency equals the ZDF [$\omega_a = (\omega_2 + \omega_3)/2 = \omega_0$]. If the pump powers are not equal, then a complete power transfer may be possible when the average frequency is in either dispersion region.

It was shown in the preceding section that the inverse MI with pumps whose frequencies are near the ZDF may provide polarization-independent phase-sensitive amplification. However, because dispersion is typically weak near the ZDF, secondary FWM processes may produce secondary pumps and idlers, which might consume bandwidth and deplete the primary pumps. One can suppress the generation of secondary signals by using primary pumps whose frequencies are far from the ZDF. Eqs. (27)-(29) have been used to model the inverse MI for the following examples of fiber parameters: $\beta_3 = 0.03$ ps$^3$/Km, $\beta_4 = -0.0003$ ps$^4$/Km, $\gamma = 10$/Km-W, and fiber length l=0.46 Km. The pump powers are $P_1 = P_3 = 0.25$ W. The slowness parameter $\beta_1$ typically has no substantial effect on the inverse MI when the waves are co-polarized.

Figure 7:
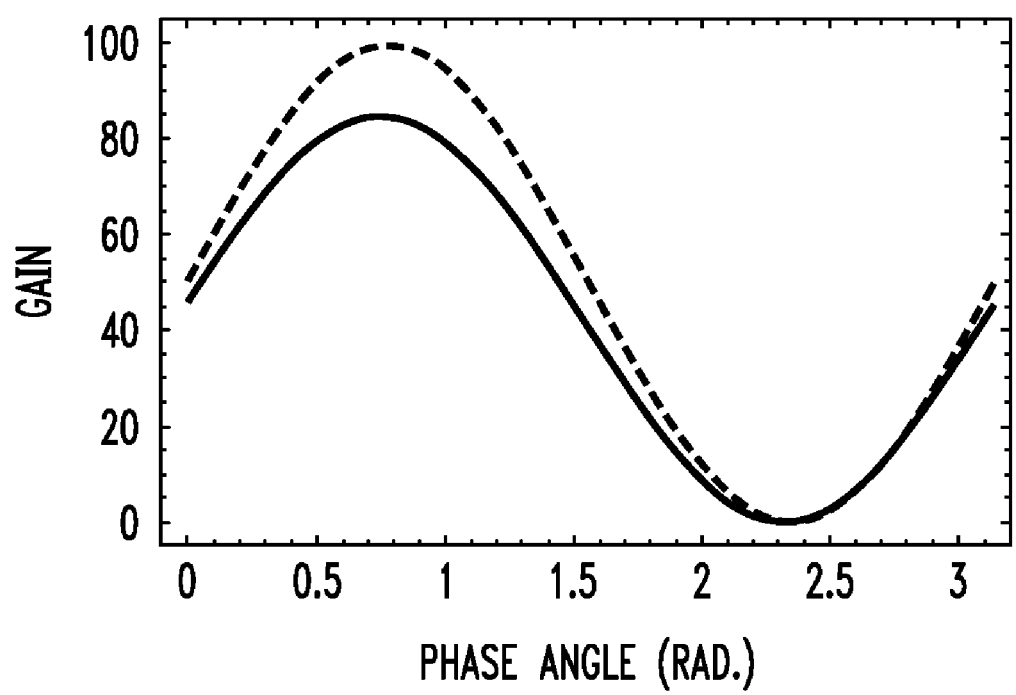
FIG. 7 graphically shows predicted and simulated signal gain in the OPD of FIG. 3 as a function of the input-signal phase for a representative example of an inverse modulational-interaction (MI) configuration.

FIG. 7 graphically shows a prediction and a simulation of signal gain in OPD 300 as a function of the input-signal phase, for an inverse-MI configuration, in which the pump-wave frequencies are $\omega_1 = -8.25$ Tr/s and $\omega_3 = 11.75$ Tr/s, and the signal frequency is $\omega_2 = 1.75$ Tr/s. These frequencies are measured relative to the ZDF. Note that, relative to the signal, the pump frequencies are $\pm\omega_d$, where the difference frequency $\omega_d = 10$ Tr/s. The dispersion coefficient $\beta_2(\omega_2) = 0.052$. The inverse-MI Eq. (29) predicts that the signal gain, $P_2(z)/P_2(0)$, attains a maximum of 20 dB when the signal phase $\phi_2(0) = 0.78$ rad, and a minimum of $-20$ dB when $\phi_2(0) = 2.32$ rad. In FIG. 7, the dashed curve corresponds to the theoretical prediction [Eq. (29)], and the solid curve corresponds to the result obtained by direct numerical simulation [Eqs. (5a-b)]. As can be seen, the theoretical predictions agree quite well with the simulation results. Small discrepancies between the two curves are probably due to the presence of weak FWM cascades.

Figure 8A:
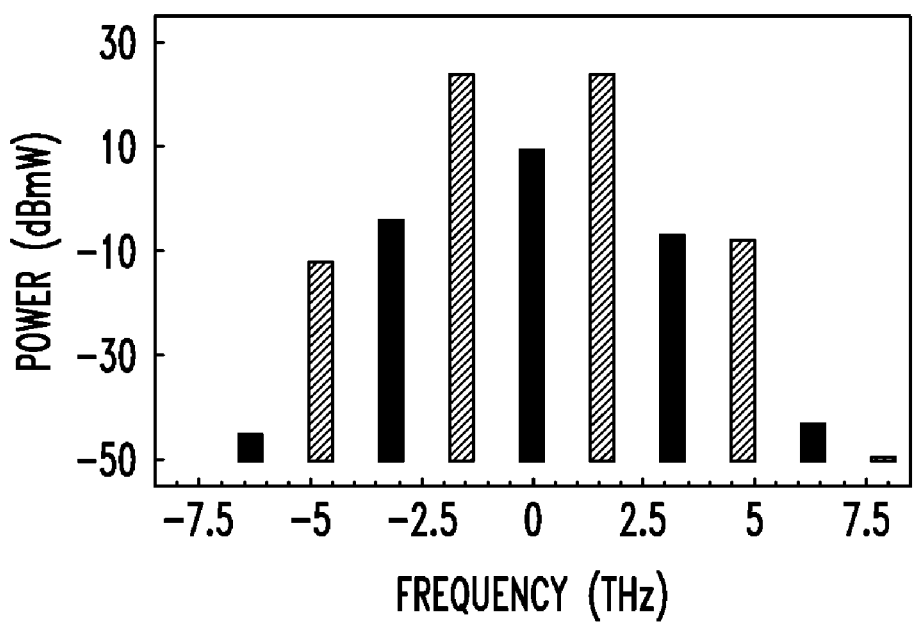
FIG. 8A-B graphically show predicted and simulated generation of a cascade of frequencies in the OPD of FIG. 3 for a representative example of the inverse-MI configuration(s) corresponding to FIG. 7.
Figure 8B:
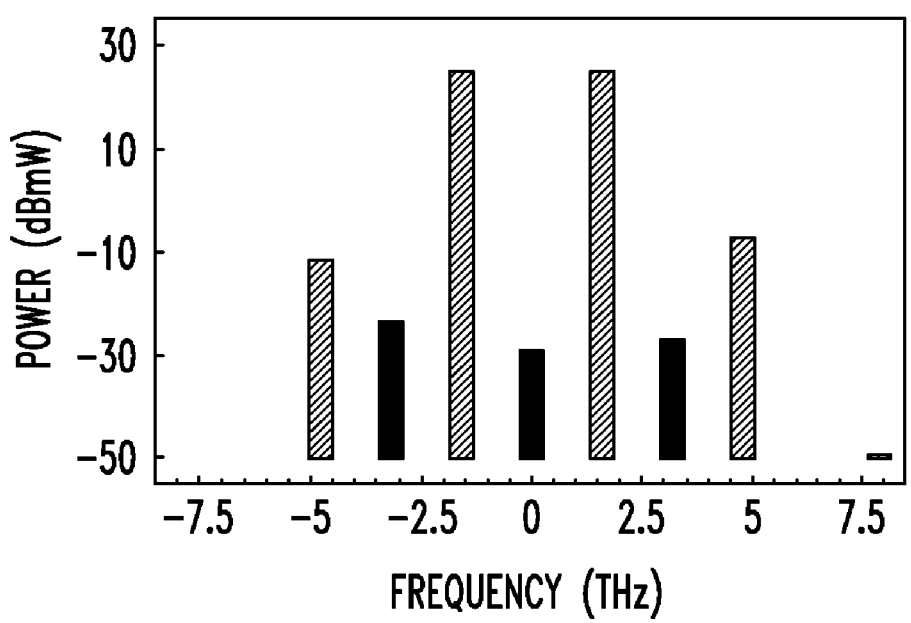

FIGS. 8A-B graphically show the generation of a cascade of frequencies in OPD 300 for the inverse-MI configuration corresponding to FIG. 7. The initial signal power is about $-10$ dBmW. FIG. 8A shows that, when signal phase $\phi_2(0) = 0.78$ rad, the signal is amplified by about 19.3 dB. FIG. 8B shows that, when $\phi_2(0) = 2.35$ rad, the signal is attenuated by about 19.3 dB. Pump-pump FWM does not involve the signal and therefore is typically intrinsically phase-insensitive, which is demonstrated by substantially similar secondary-pump powers in both FIGS. 8A-B. Note that the number of secondary pumps in FIGS. 8A-B is significantly smaller than that in FIGS. 4B-C.

Figure 9:
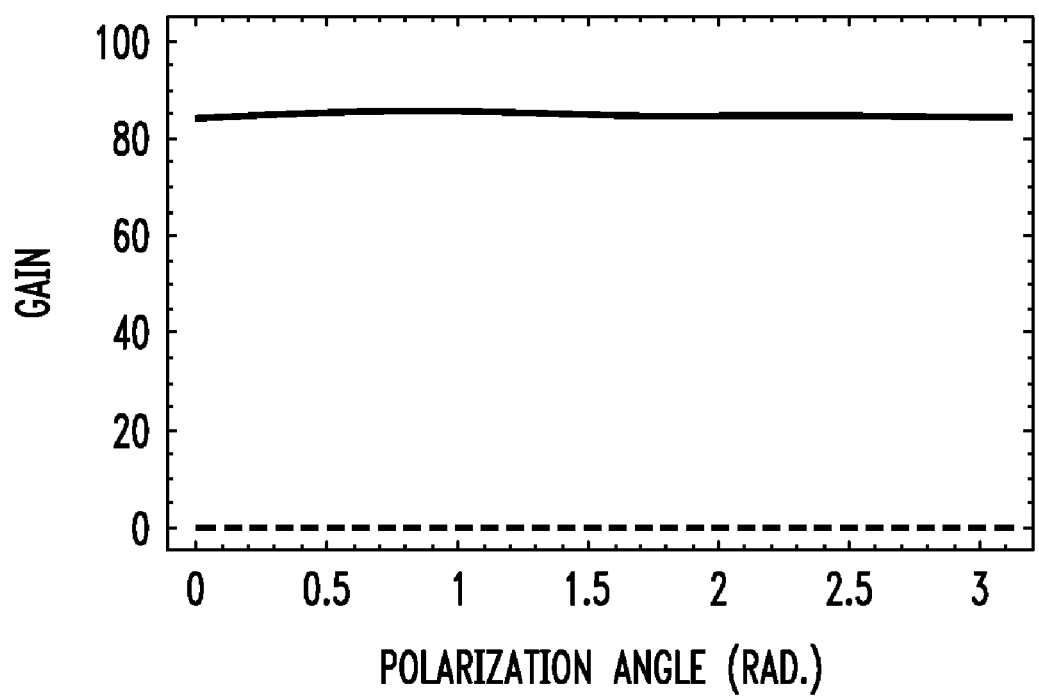
FIG. 9 graphically shows simulation results for the signal gain in the OPD of FIG. 3 as a function of the polarization angle for examples of the inverse-MI configuration corresponding to FIG. 7.

FIG. 9 graphically shows simulation results for the signal gain as a function of the polarization angle for the inverse MI configuration corresponding to FIG. 7. The solid curve corresponds to signal phase $\phi_2(0) = 0.78$ rad, and the dashed curve corresponds to $\phi_2(0) = 2.35$ rad. For $\phi_2(0) = 0.78$ rad, the amplification varies by $\pm 0.04$ dB. For $\phi_2(0) = 2.35$ rad, the attenuation varies by $\pm 0.03$ dB. Hence, the results of FIG. 9 demonstrate that substantially polarization-independent, phase-sensitive amplification is possible in OPD 300 with dissimilar pump frequencies.

The foregoing description primarily focused on inverse MI, which provides phase-sensitive amplification. The remaining portion of this section contains a discussion of PC [as described by Eqs. (30) and (31)] and BS [as described by Eqs. (32) and (33)]. Recall that a PC process may provide phase-insensitive amplification, whereas a BS process may provide phase-insensitive frequency conversion (provided that there are no input idlers). It was previously shown that strong birefringence can suppress vector PC, which involves x- and y-polarized pumps, and x- and y-polarized sidebands. This result implies that scalar x-polarized PC and y-polarized PC are independent processes. It was also shown that birefringence can inhibit vector BS, which involves x-polarized pumps and y-polarized sidebands, or x- and y-polarized pumps, and x- and y-polarized sidebands. This result implies that scalar x-polarized BS and y-polarized BS may be independent processes.

Figure 10:
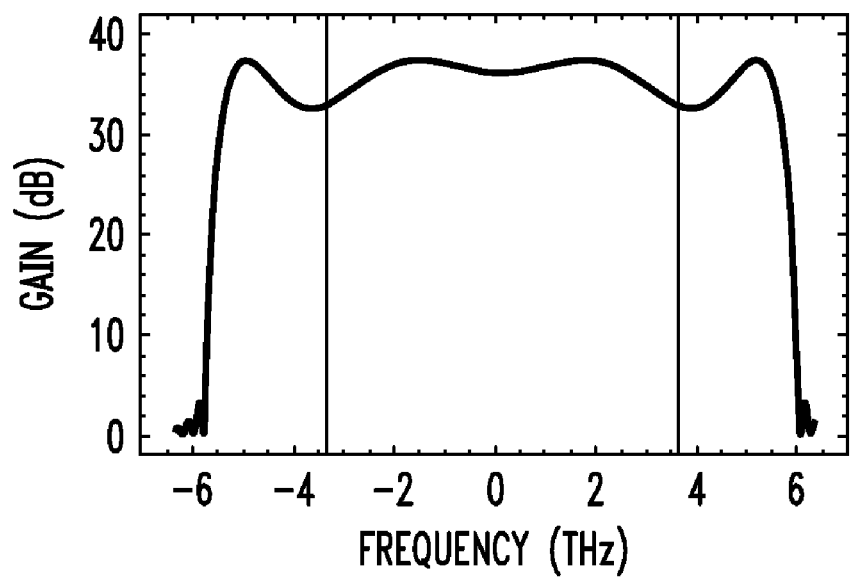
FIG. 10 graphically shows simulation results for the signal gain in the OPD of FIG. 3 as a function of the input-signal frequency for a representative example of a phase-conjugation (PC) configuration.

FIG. 10 graphically shows the signal gain in OPD 300 as a function of the input-signal frequency, for a PC configuration, in which the pump frequencies are $\omega_2 = -21.1$ Tr/s and $\omega_3 = 22.9$ Tr/s (measured relative to the ZDF). The dispersion coefficient $\beta_2(\omega_a) = 0.028$, where $\omega_a = (\omega_2 + \omega_3)/2$ is the average of the pump frequencies. The fiber parameters are $\beta_3 = 0.03$ ps$^3$/Km, $\beta_4 = -0.0003$ ps$^4$/Km, $\gamma = 10$/Km-W, and fiber length l=1.0 Km. The pump powers are $P_1 = P_3 = 0.25$ W. The slowness parameter $\beta_1$ has substantially no effect on PC when the waves are co-polarized. The results of FIG. 10 demonstrate that, using PC, signals with a wide range of frequencies can be amplified by about 36 dB. Outer gain bands ($\omega_1 < \omega_2 < \omega_3 < \omega_4$) and inner bands ($\omega_2 < \omega_1 < \omega_4 < \omega_3$) exist simultaneously because $\beta_4 < 0$.

The theoretical predictions of FIG. 10 were tested by independent scalar and vector numerical simulations based on Eqs. (5a-b), for the aforementioned fiber parameters (in addition to which $\beta_{1x} = 50$ ps$^3$/Km and $\beta_{1y} = -50$ ps$^3$/Km) and pump frequencies. The main features (gain levels and locations of the gain maxima) of the numerically obtained gain profiles are substantially consistent with the theoretical predictions. For the frequencies that are comparable to the pump frequencies, the theoretically predicted gains are somewhat higher than the simulated gains because the PC equations omit the effects of sidebands produced by simultaneous MI and BS.

A separate numerical simulation was conducted for a case in which both pumps were polarized at 45 degrees to the birefringence axes of NLF or NPOW 308. The spectra obtained for different polarization components were almost identical to the spectrum of FIG. 10. This result implies that a PC process can be used to obtain polarization-independent, phase-insensitive amplification in a birefringent fiber, for a wide range of signal frequencies.

Figure 11:
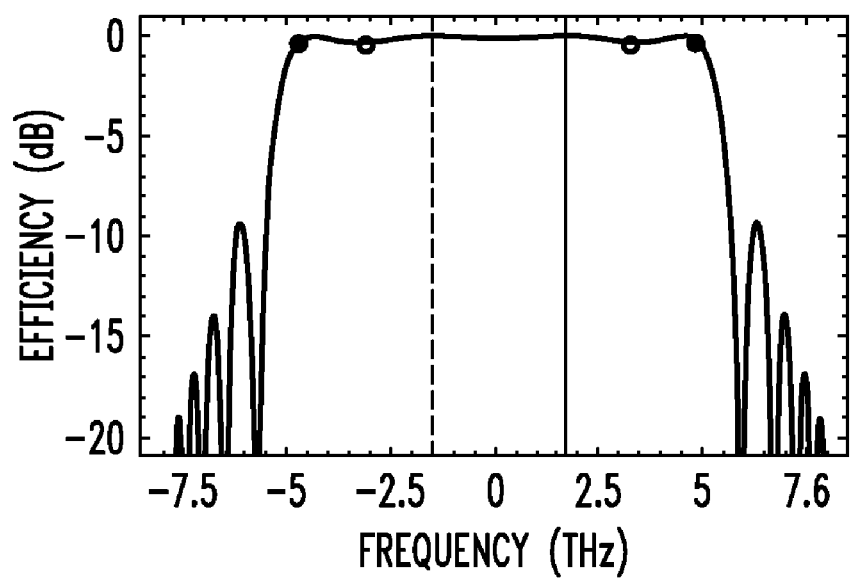
FIG. 11 graphically shows simulation results for the signal-to-idler conversion efficiency in the OPD of FIG. 3 as a function of the lower pump frequency $\omega_1$ for representative examples of a Bragg scattering (BS) configuration.

FIG. 11 graphically shows the signal-to-idler conversion efficiency in OPD 300 as a function of the lower pump frequency $\omega_1$, for a BS configuration, in which $\beta_3$=0.03 ps$^3$/Km, $\beta_4$=−0.0003 ps$^4$/Km, $\gamma$=10/Km-W, and fiber length l=0.31 Km. The pump powers are $P_1$=$P_3$=0.25 W. The slowness parameter $\beta_1$ has substantially no effect on the BS when the waves are co-polarized. The dispersion coefficient $\beta_2(\omega_a)$= 0.022, where $\omega_a$=$(\omega_2+\omega_3)$/2 is the average of the signal frequency and the higher pump frequency. The solid and dashed lines in FIG. 11 denote the higher-pump and signal frequencies, respectively. The hollow circles denote the lower pump and idler frequencies of −19.26 and 20.74 Tr/s, respectively, for which the predicted conversion efficiency is −0.36 dB. The solid circles denote frequencies of −29.26 and 30.74 Tr/s, for which the conversion efficiency is −0.25 dB. The results of FIG. 11 demonstrate that, using BS, conversion efficiency higher than −1 dB can be achieved for a wide range of lower pump and idler frequencies, which enables the idler frequency to be tuned as desired.

Figure 12A:
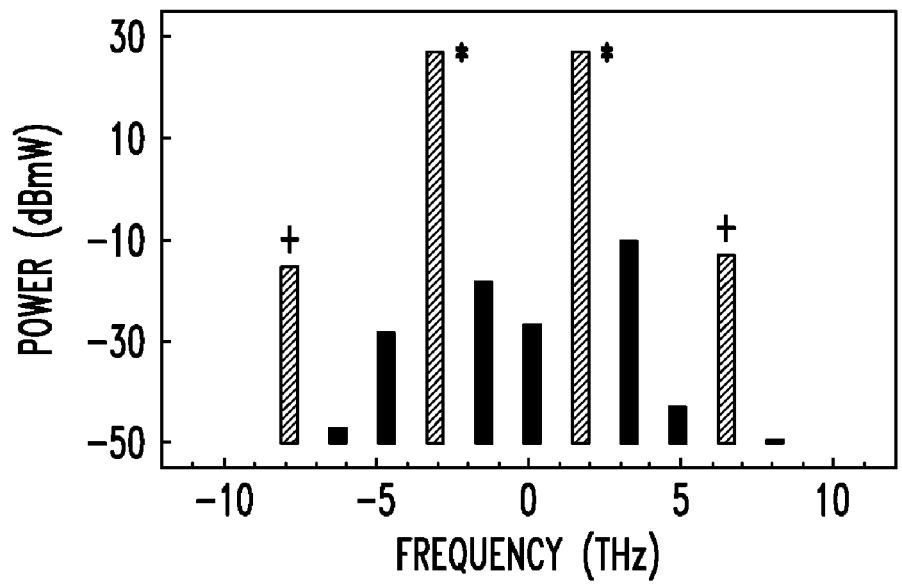
FIGS. 12A-B graphically show simulation results for the generation of a cascade of frequencies in the OPD of FIG. 3 for another representative example of a BS configuration.
Figure 12B:
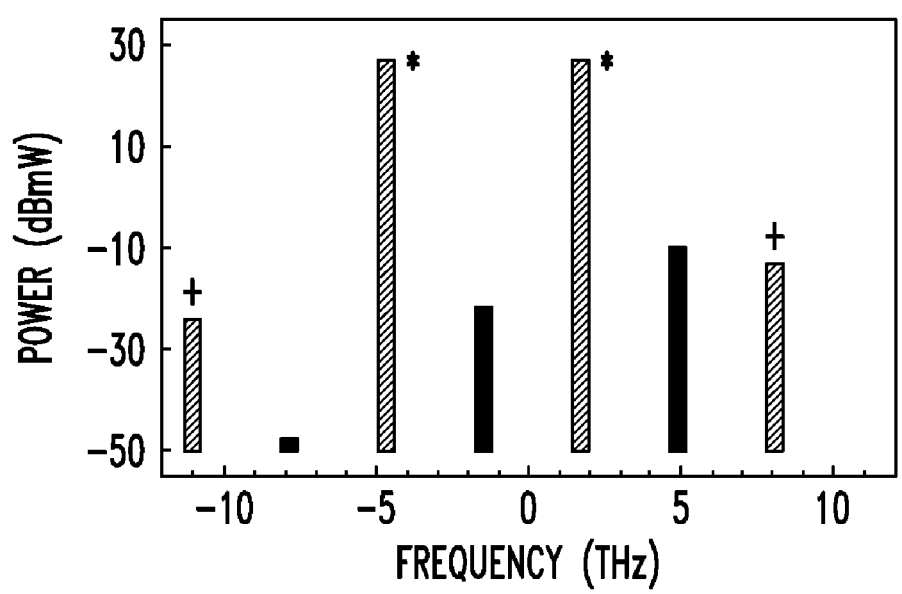

FIGS. 12A-B graphically show the generation of a cascade of frequencies in OPD 300 for a representative BS configuration. The signal frequency is −1.47 THz, the higher pump frequency is 1.71 THz and the (common) pump power is 0.25 W. In FIG. 12A, the lower pump frequency is −3.07 THz, and the idler frequency is 3.30 THz. In FIG. 12B, the lower pump frequency is −4.66 THz, and the idler frequency is 4.89 THz. The bars marked with a star denote the primary pumps, the bars marked with a plus denote the secondary pumps, and the remaining bars denote the signal and idlers. The secondary pump modes are produced by pump-pump FWM, and two (idler) modes produced by MI and PC. In both cases, the signal is attenuated by about 10 dB (so most of the input-signal power is transferred to the output idler). Larger frequency differences between the lower pump and signal, and the higher pump, correspond to weaker secondary modes. Similarly, stronger dispersion corresponds to weaker secondary modes.

Figure 13:
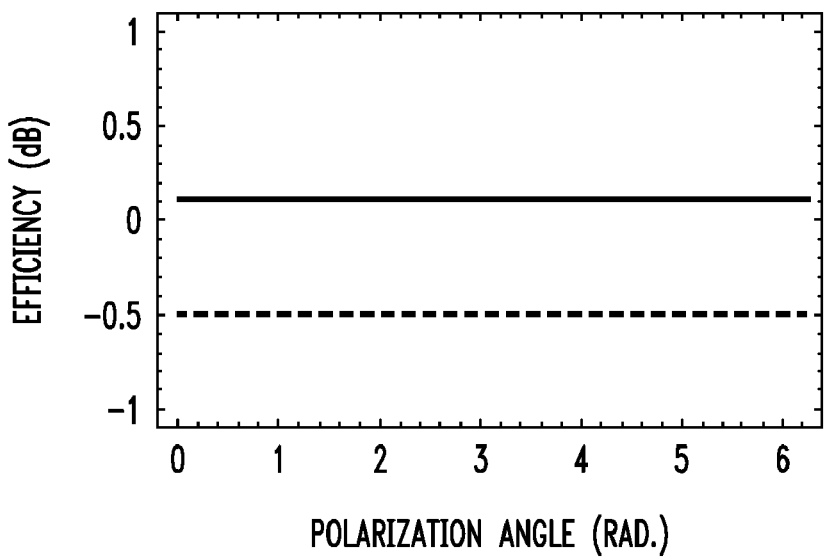
FIG. 13 graphically shows simulation results for the signal-to-idler conversion efficiency in the OPD of FIG. 3 as a function of the polarization angle for exemplary configurations corresponding to FIG. 12.

FIG. 13 graphically shows simulation results for the signal-to-idler conversion efficiency in OPD 300 as a function of the polarization angle for configurations corresponding to FIG. 12. The signal frequency is −1.47 THz, the higher pump frequency is 1.71 THz, and the pump power is 0.25 W in each polarization of each (primary) pump wave. The dashed curve corresponds to a lower pump frequency of −3.07 THz and an idler frequency of 3.30 THz. The solid curve corresponds to a lower pump frequency of −4.66 THz and an idler frequency of 4.89 THz. The pump waves are polarized at 45 degrees to the birefringence axes of the fiber. FIG. 13 demonstrates that, for both idler frequencies (3.30 and 4.89 THz), the polarization dependence of the conversion efficiency is very weak ($\leq$0.01 dB). These results substantially imply that polarization-independent frequency conversion based on a BS process is possible in a birefringent fiber, for a wide range of idler frequencies. To tune the frequency of the idler, one can tune the frequency of one of the pump waves, or the frequencies of both pump waves.

In summary, when most of the wave frequencies are far from the ZDF, the effects of dispersion are typically important and typically cannot be neglected. For a typical MI, PC, or BS configuration of OPD 300, the effects of dispersion may reduce, but do not typically eliminate completely, the cascade of secondary waves produced by various FWM processes. When the pump frequencies are far from the ZDF, but the signal frequency is near the ZDF, the presence of a weak cascade does not typically affect the signal evolution significantly. If the pump waves are linearly polarized at 45 degrees to the birefringence axes, then the inverse MI may produce substantially polarization-independent, phase-sensitive amplification. When the pump and signal frequencies are all far from the ZDF, but close to each other, the signal may evolve in a phase-sensitive manner, but the presence of a moderate cascade may limit the magnitude of signal amplification.

Two additional FWM processes, i.e., phase conjugation (PC) and Bragg scattering (BS), were also considered. In PC, the sum of the sideband frequencies equals the sum of the pump frequencies. In BS, the difference between the sideband frequencies equals the difference between the pump frequencies. PC may provide phase-insensitive amplification, whereas BS may provide phase-insensitive frequency conversion. Dispersion in NLF or NPOW 308 may affect both processes. If the pump waves are polarized at 45 degrees to the birefringence axes, then the signals in the PC and BS configurations may experience polarization-independent amplification and frequency conversion, respectively. The weak cascades of frequencies that are generated in NLF or NPOW 308 may not significantly degrade the relevant properties of PC and BS. However, the bandwidths of these polarization-independent processes might be limited by the presence of a (usually small) difference between the zero-dispersion frequencies corresponding to the two birefringence axes.

Figure 14:
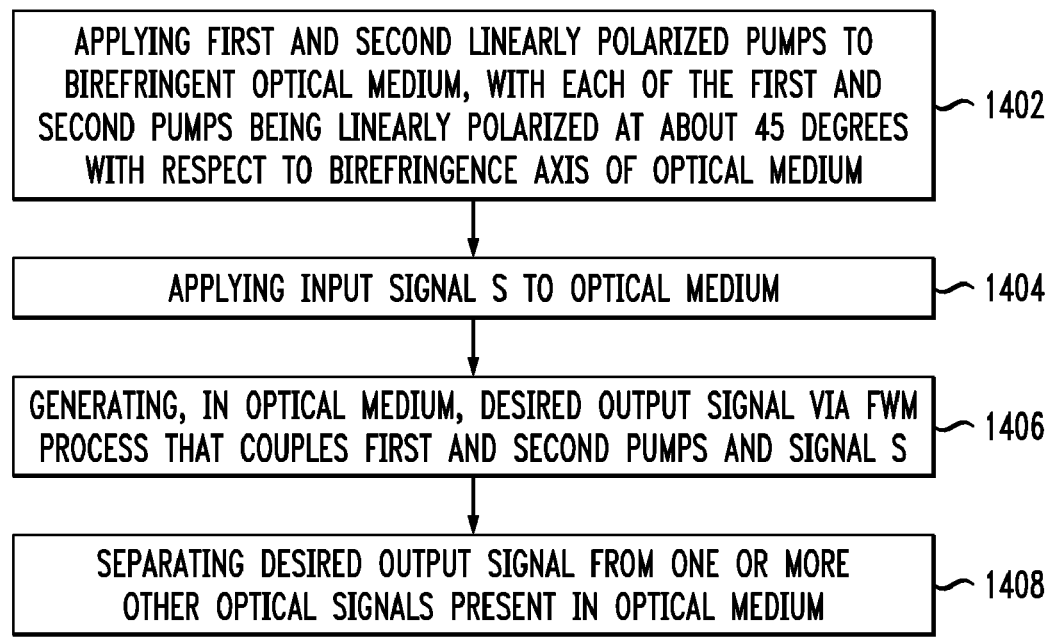
FIG. 14 shows a flowchart of a method of operating an optical parametric device according to one embodiment of the invention.

FIG. 14 shows a flowchart of a method 1400 of operating an OPD, such as OPD 300 of FIG. 3, according to one embodiment of the invention.

At step 1402 of method 1400, first and second linearly polarized pump light waves are applied to a birefringent optical medium of the OPD. For example, see FIG. 3, where the pump light waves generated by optical pumps 306a-b are applied via optical couplers 304a-b to NLF or NPOW 308. The optical medium is adapted to perform four-wave mixing. Each of the first and second pump light waves is polarized at about 45 degrees with respect to a birefringence axis of the optical medium.

At step 1404 of method 1400, an input signal S is applied to the optical medium. For example, see FIG. 3, where the input signal received via fiber section 302 is applied via optical coupler 304b to NLF or NPOW 308.

At step 1406 of method 1400, a corresponding FWM process that couples the first and second pumps and input signal S generates, in the optical medium, a desired output signal. For example, the FWM process might include inverse modulational interaction, phase conjugation, and/or Bragg scattering.

At step 1408 of method 1400, the desired output signal is separated from one or more other optical signals present in the optical medium. For example, see FIG. 3, where optical filter 310 separates a desired output signal from other optical signals present in NLF or NPOW 308 and applies that signal to fiber section 302'.

Throughout this specification, the units of [/Km-W] and [Tr/s] stand for per kilometer-watt and teraradians per second, respectively.

In various embodiments of the invention, the difference ($\delta n$) between the effective refractive indices corresponding to the fast and slow waves can be, e.g., between about 10$^{-7}$ and about 10$^{-3}$. The lower values of $\delta n$ correspond to relatively weak birefringence, and the higher values of $\delta n$ correspond to relatively strong birefringence. For typical pump-wave powers amplification, attenuation, or wavelength-conversion results may be obtained for values of δn ranging from about $10^{-5}$ to about $10^{-3}$.

While this invention has been described with reference to illustrative embodiments, this description is not intended to be construed in a limiting sense. For example, the desired polarizations can be produced in either lasers 306 or optical couplers 304, or by the combined effect of both. Various modifications of the described embodiments, as well as other embodiments of the invention, which are apparent to persons skilled in the art to which the invention pertains are deemed to lie within the principle and scope of the invention as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

What is claimed is:

1. A method of operating an optical parametric device, OPD, comprising the steps of:
    applying first and second polarized pumps to a birefringent optical medium of the OPD, said optical medium adapted to perform four-wave mixing, FWM, wherein each of the first and second pumps is polarized at about 45 degrees with respect to a birefringence axis of said optical medium;
    applying an input signal S to said optical medium; and
    generating, in the optical medium, a desired output signal via an FWM process that couples the first and second pumps and the signal S.

2. The invention of claim 1, wherein power variations in the desired output signal caused by any variations in a polarization of the input signal S does not exceed about 10%.

3. The invention of claim 1, further comprising the step of separating the desired output signal from one or more other optical signals present in the optical medium.

4. The invention of claim 1, wherein:
    said FWM process comprises inverse modulational interaction; and
    the step of generating comprises amplifying or attenuating the signal S via said inverse modulational interaction to generate the desired output signal.

5. The invention of claim 4, wherein said amplification or attenuation is phase sensitive.

6. The invention of claim 5, further comprising the step of adjusting a phase of the signal S to cause the signal S to be amplified via said inverse modulational interaction.

7. The invention of claim 5, further comprising the step of adjusting a phase of the signal S to cause the signal S to be attenuated via said inverse modulational interaction.

8. The invention of claim 4, wherein a frequency range including a set consisting of a zero-dispersion frequency of the optical medium and frequencies of the signal S and the first and second pumps is not wider than about 1 THz.

9. The invention of claim 1, wherein:
    said FWM process produces phase conjugation; and
    the step of generating comprises amplifying the signal S via said phase conjugation to generate the desired output signal.

10. The invention of claim 1, wherein:
    said FWM process produces Bragg scattering; and
    the step of generating comprises generating an idler signal via said Bragg scattering, said idler signal being the desired output signal.

11. The invention of claim 10, further comprising the step of varying a frequency of at least one of the first and second pumps to tune a frequency of the idler signal.

12. The invention of claim 1, wherein the first and second pumps and the signal S are applied to the optical medium so that the first and second pumps and the signal S propagate in the optical medium along a common direction.

13. An optical parametric device, OPD, for generating a desired output signal, comprising:
    a birefringent optical medium adapted to perform four-wave mixing, FWM; and
    one or more couplers adapted to apply first and second polarized pumps and an input signal S to the optical medium, wherein:
        each of the first and second pumps is polarized at about 45 degrees with respect to a birefringence axis of said optical medium; and
        the optical medium is adapted to generate the desired output signal via an FWM process that couples the first and second pumps and the signal S.

14. The invention of claim 13, wherein the OPD is adapted to generate the desired output signal so that power variations in the desired output signal caused by any variations in a polarization of the input signal S does not exceed about 10%.

15. The invention of claim 13, further comprising an optical filter coupled to the optical medium and adapted to separate the desired output signal from one or more other optical signals present in the optical medium.

16. The invention of claim 13, wherein:
    said FWM process comprises inverse modulational interaction; and
    the optical medium is adapted to amplify or attenuate the signal S via said inverse modulational interaction to generate the desired output signal.

17. The invention of claim 16, wherein:
said amplification or attenuation is phase sensitive; and
the OPD further comprises a phase shifter adapted to controllably change a phase of the signal S to select whether said inverse modulational interaction subjects the signal S to amplification or attenuation.

18. The invention of claim 13, wherein:
said FWM process produces phase conjugation; and
the optical medium is adapted to amplify the signal S via said phase conjugation to generate the desired output signal.

19. The invention of claim 13, wherein:
said FWM process produces Bragg scattering; and
the optical medium is adapted to generate an idler signal via said Bragg scattering, said idler signal being the desired output signal.

20. The invention of claim 13, wherein the one or more couplers are adapted to apply the first and second pumps and the signal S to the optical medium so that the first and second pumps and the signal S propagate in the optical medium along a common direction.

* * * * *